(12) United States Patent
Jager

(10) Patent No.: US 7,762,391 B2
(45) Date of Patent: Jul. 27, 2010

(54) CONVEYOR CHAIN

(76) Inventor: Todd G. Jager, 1324 Buchanan Ave., Sioux City, IA (US) 51106

( * ) Notice: Subject to any disclaimer, the term of this patent is extended or adjusted under 35 U.S.C. 154(b) by 161 days.

(21) Appl. No.: 12/217,922

(22) Filed: Jul. 10, 2008

(65) Prior Publication Data

US 2010/0006404 A1     Jan. 14, 2010

(51) Int. Cl.
*B65G 17/06* (2006.01)
(52) U.S. Cl. ...................... 198/853; 198/850
(58) Field of Classification Search .......... 198/850–853
See application file for complete search history.

(56) References Cited

U.S. PATENT DOCUMENTS

| | | | |
|---|---|---|---|
| 4,014,267 A | | 3/1977 | Fitch |
| 4,964,344 A | * | 10/1990 | Robinson ................ 104/172.5 |
| 5,121,831 A | * | 6/1992 | Fesler ......................... 198/853 |
| 5,378,205 A | * | 1/1995 | Gohl et al. ................... 474/206 |
| 5,606,915 A | * | 3/1997 | Harris ....................... 104/172.4 |
| 6,098,787 A | * | 8/2000 | Murano ....................... 198/500 |
| 6,691,862 B1 | * | 2/2004 | Mogens ....................... 198/851 |
| 6,991,094 B2 | * | 1/2006 | Frost ........................... 198/853 |
| 7,246,699 B2 | * | 7/2007 | Frost et al. .................. 198/851 |
| 7,600,633 B2 | * | 10/2009 | Rathbun et al. ............. 198/851 |

* cited by examiner

*Primary Examiner*—Douglas A Hess
(74) *Attorney, Agent, or Firm*—Dennis L. Thomte; Thomte Patent Law Office LLC

(57) ABSTRACT

A conveyor chain comprising a plurality of substantially identical alternate elongated metal main links, each of which have a longitudinally extending opening therein which define U-shaped pivot pin receiving portions at the opposite ends thereof. A non-metallic U-shaped insert is positioned in each of the U-shaped pivot pin receiving portions. The chain also includes alternate pairs of substantially identical upper and lower metal links between the main links with metal pivot pins interconnecting the main links and the upper and lower links. The metal pivot pins are received by the U-shaped inserts. Modified forms of the pivot pins and inserts are also disclosed.

2 Claims, 9 Drawing Sheets

CONVEYOR CHAIN

BACKGROUND OF THE INVENTION

1. Field of the Invention

This invention relates to a metal power conveyor chain having alternate center or main links that are pivotally interconnected by alternate pairs of side links through pivot pins and more particularly to a power conveyor chain wherein non-metallic inserts are inserted into the opposite inner ends of the main links to prevent the metal pivot pins from engaging the metal main links.

2. Description of the Related Art

Many conveyor chains such as are sometimes referred to as power chains or power conveyor chains have long been used to convey articles or products, in an overhead fashion, within factories and meat packing plants. The conventional metal power chain conveyor such as that sold by American Chain & Cable Company, Inc. of Bridgeport, Conn. and disclosed in U.S. Pat. No. 4,014,267 includes alternate center or main links that are pivotally interconnected by alternate pairs of side links through pivot pins.

In use, it is necessary to lubricate the metal pivot pins and associated links. If the pivot pins and links are overly lubricated, oil or grease may fall downwardly from the conveyor chain onto personnel or the products being conveyed. If the pivot pins and links are not properly lubricated, the pivot pins and associated structure will rust with rust particles falling downwardly from the conveyor chain. The over-lubrication and the under-lubrication of the conveyor chains is a serious problem in meat packing facilities due to the possible contamination of the meat products. The lubrication problem in meat packing plants is especially troublesome due to the fact that the conveyor chains are frequently sprayed with water and chemicals to clean and sanitize the conveyor chains.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The conveyor chain of this invention includes a plurality of identical alternate elongated main links comprised of a metal material with each of the main links having a longitudinally extending opening formed therein which defines generally U-shaped pivot pin receiving portions at the opposite ends thereof. A non-metallic, generally U-shaped insert is positioned in each of the U-shaped pivot pin receiving portions. Alternate pairs of identical upper and lower links are provided between the main links and are also comprised of a metal material. The upper and lower links have longitudinally extending openings formed therein. Metal pivot pins pivotally interconnect the main links and the upper and lower links. The metal pivot pins are received by the U-shaped non-metallic inserts thereby preventing the metal pivot pins from engaging the metal pivot pin receiving portions of the main links. In the preferred embodiment, the inserts are secured to the main links by an adhesive or the like and are preferably comprised of a plastic or Nylon material. The method of modifying an existing metal conveyor chain is also described to enable the U-shaped pivot pin receiving portions of the main links to be ground or milled to accommodate the insertion of the U-shaped inserts therein. Modified forms of the inserts and pivot pins are also disclosed.

It is therefore a principal object of the invention to provide an improved power conveyor chain.

Still another object of the invention is to provide a conveyor chain wherein the pivot pins thereof do not have to be lubricated with oil or grease.

A further object of the invention is to provide a conveyor chain wherein the pivot pin receiving portions of the main links have U-shaped non-metallic inserts inserted therein.

Still another object of the invention is to provide a conveyor chain which reduces or eliminates contamination of products or articles positioned therebelow.

A further object of the invention is to provide a method of modifying an existing conveyor chain so as to accommodate the positions of U-shaped non-metallic inserts into the main links thereof.

Yet another object of the invention is to provide a conveyor chain which includes modified pivot pins and inserts for use on those chains which will be moved upwardly or downwardly in an inclined position.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
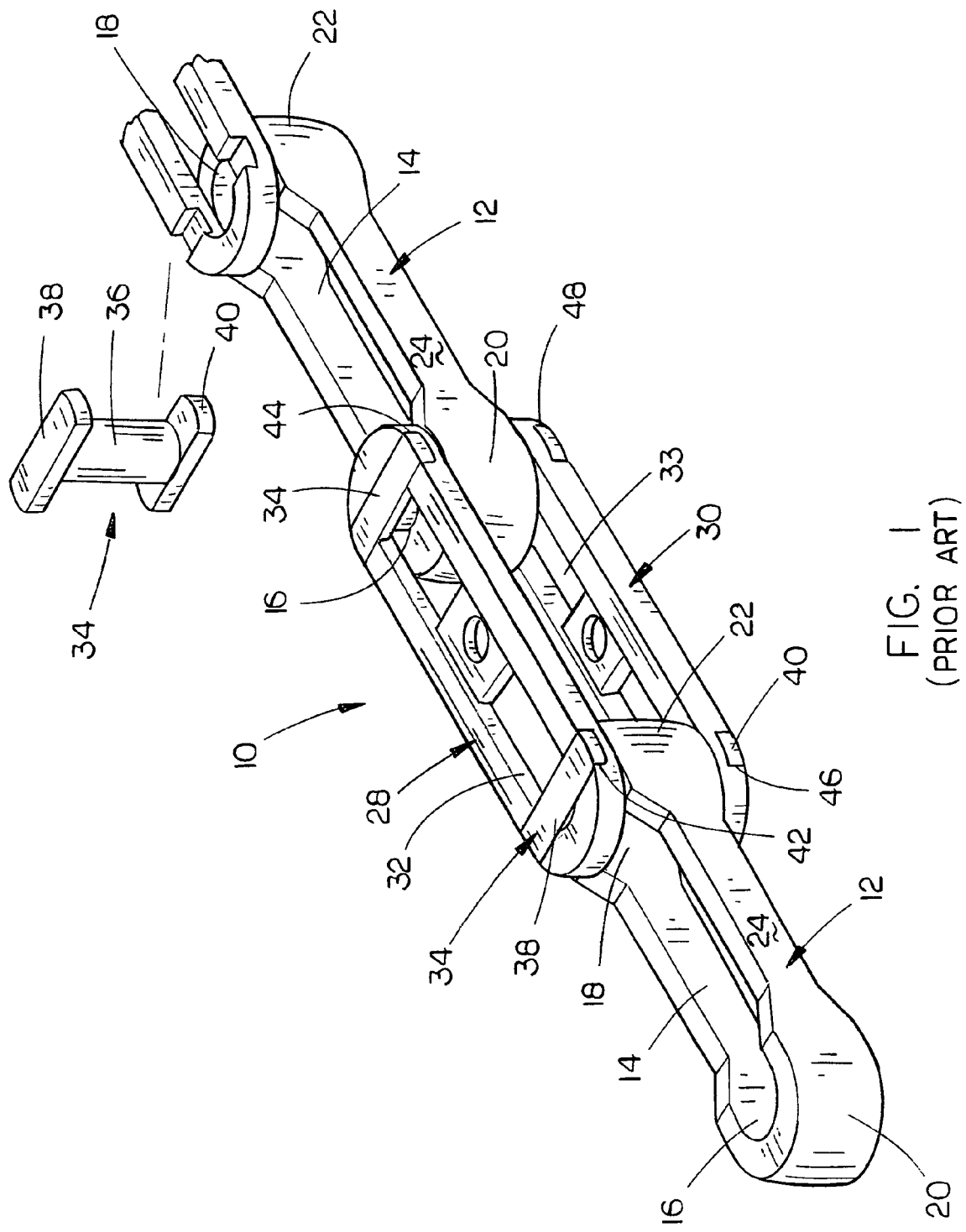
FIG. 1 is a perspective view of a prior art power chain.
Figure 2:
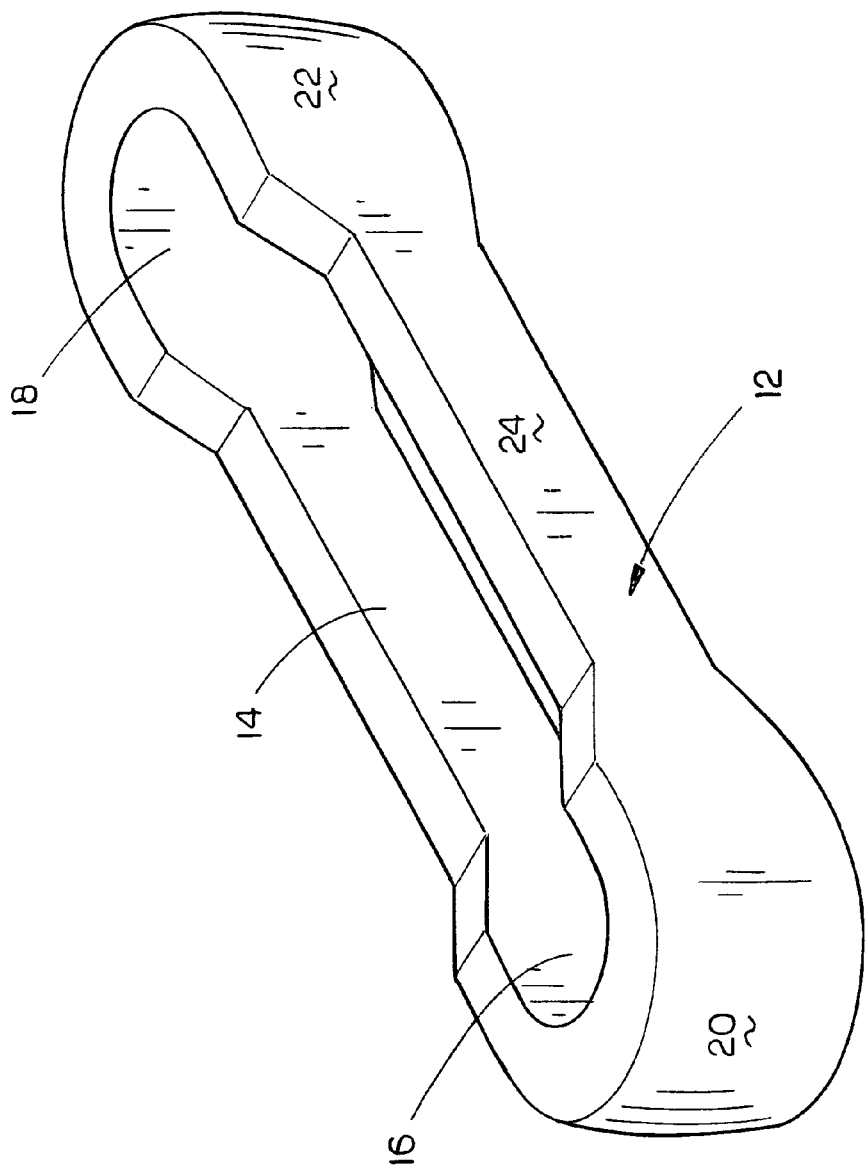
FIG. 2 is a perspective view of a main link of a prior art.

FIG. 1 illustrates a portion of a conventional prior art power chain or power conveyor chain 10 such as that disclosed in U.S. Pat. No. 4,014,267 which issued on Mar. 29, 1977. FIG. 2 illustrates a typical prior art main link of a power conveyor chain. Chain 10 is comprised of a plurality of substantially identical, alternate, elongated main links 12 which are normally comprised of a metal material such as steel. The main links 12 are sometimes also referred to as center links. Each of the main links 12 have a longitudinally extending opening 14 formed therein which defines generally U-shaped pivot pin receiving portions 16 and 18 at the opposite ends thereof. As seen in FIGS. 1 and 2, the ends 20 and 22 of main link 12 have a height which is greater than the height of the center section 24 of the link 12.

Chain 10 also includes a plurality of alternate pairs of substantially identical upper and lower links 28 and 30 respectively which are positioned between the main links 12 and which are also comprised of a metal material such as steel. The upper and lower links 28 and 30 are also sometimes referred to as side links of the chain 10. The upper and lower links 28 and 30 have one or more longitudinally extending openings 32 and 33 formed therein respectively. Metal pivot pins 34 interconnect the main links 12 and the upper and lower links 28 and 30 and are received by the inserts 26.

Figure 4:
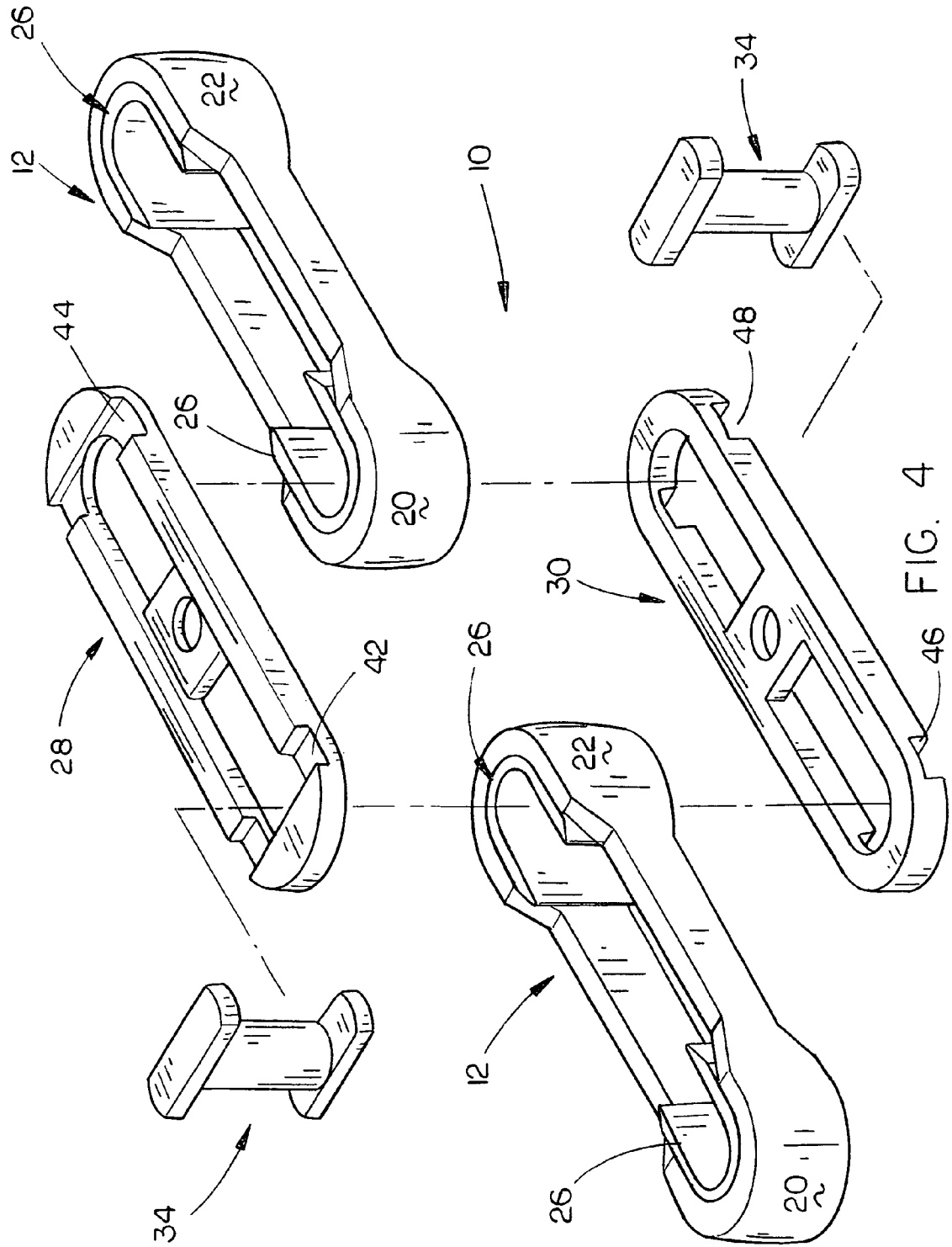
FIG. 4 is an exploded perspective view illustrating the U-shaped inserts positioned in the pivot pin receiving portions of the main links.
Figure 5:
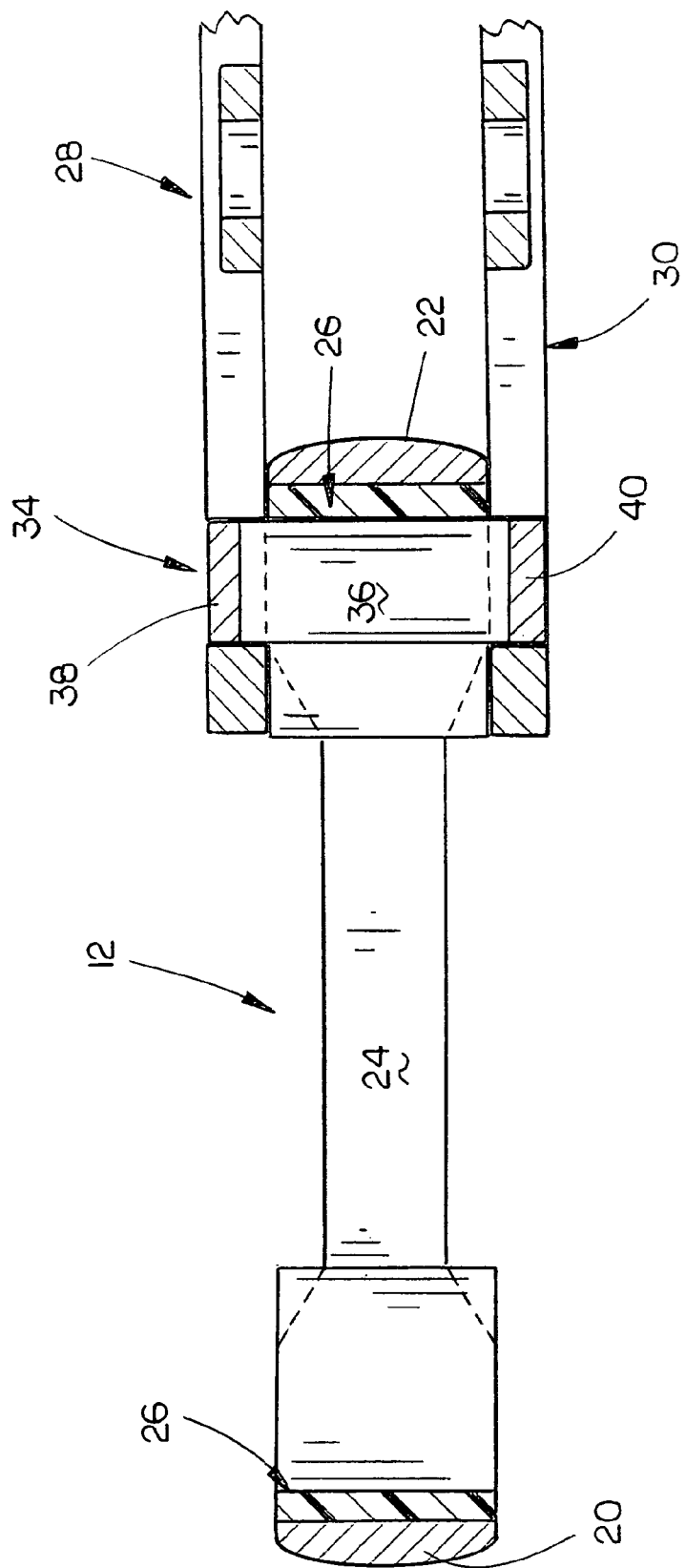
FIG. 5 is a sectional view illustrating the U-shaped inserts in position.

As seen in FIG. 1, each of the pivot pins 34 include a cylindrical center section 36 and opposite head portions 38 and 40. As also seen in FIGS. 1 and 4, the ends of link 28 have rectangular slots 42 and 44 formed therein and the ends of link 30 have rectangular slots 46 and 48 formed therein which are adapted to receive the head portions of the pivot pins 34 therein. It is this prior art conveyor chain that is either modified at the time of manufacture or at a later time after the chain has been in use.

In the drawings, the numeral 26 refers to a non-metallic U-shaped insert which is inserted into each of the pivot pin receiving portions 16. Preferably the inserts 26 are comprised of a plastic or Nylon material. Each of the inserts 26 has leg portions 50 and 52 which are tapered at 54 and 56 respectively.

Figure 3:
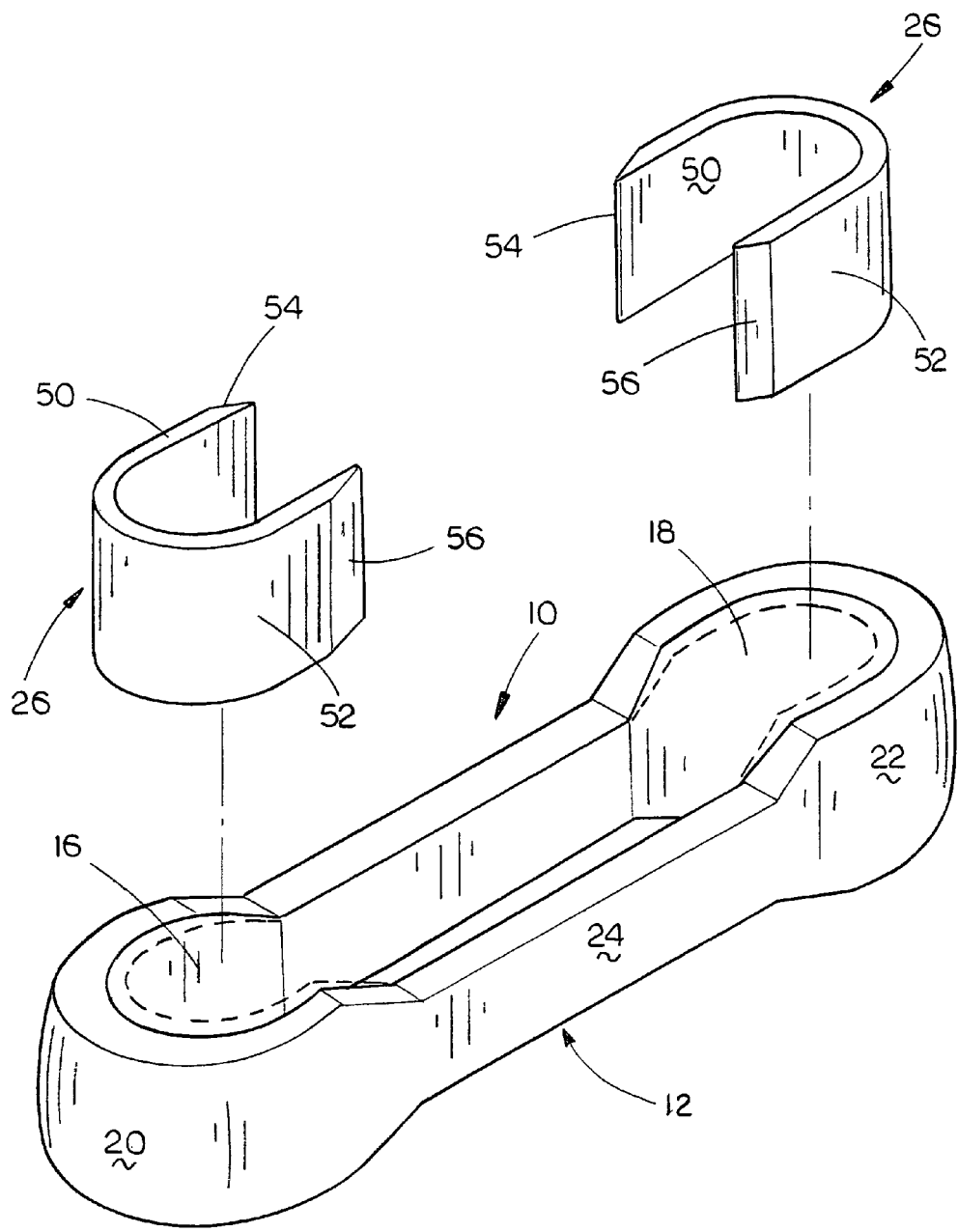
FIG. 3 is an exploded perspective view illustrating the manner in which the pivot pin receiving portions of a main link receive the U-shaped inserts therein.

If the chain 10 has already been fabricated and is in use, and it is desired to modify the same, the chain is disassembled and the pivot pin receiving portions 16 and 18 thereof are ground or milled to enlarge the same as seen in FIG. 3 to facilitate the insertion of the U-shaped inserts 26 therein with the size and shape of the inserts 26 being complimentary to the existing pivot pins 34. The inserts 26 are preferably adhesively secured to the walls of the pivot pin receiving portions.

If the chain 10 is being fabricated at the factory, the pivot pin receiving portions 16 and 18 will be dimensioned such as that when the inserts 26 are inserted therein, they will be complimentary in size to the pivot pins 34.

The inserts 26 provide a non-metallic bearing or pivot surface for the pivot pins 34. The inserts prevent metal-to-metal contact between the pivot pins 34 and the pivot pin receiving portions of the main links 12. By utilizing the plastic or Nylon inserts, the risk of metal particles from falling downwardly from the chain is greatly reduced or eliminated. The inserts 26 eliminate the need to lubricate the chain thereby preventing oil or grease from falling from the chain. If the inserts 26 become worn during use, they are easily replaced.

Figure 6:
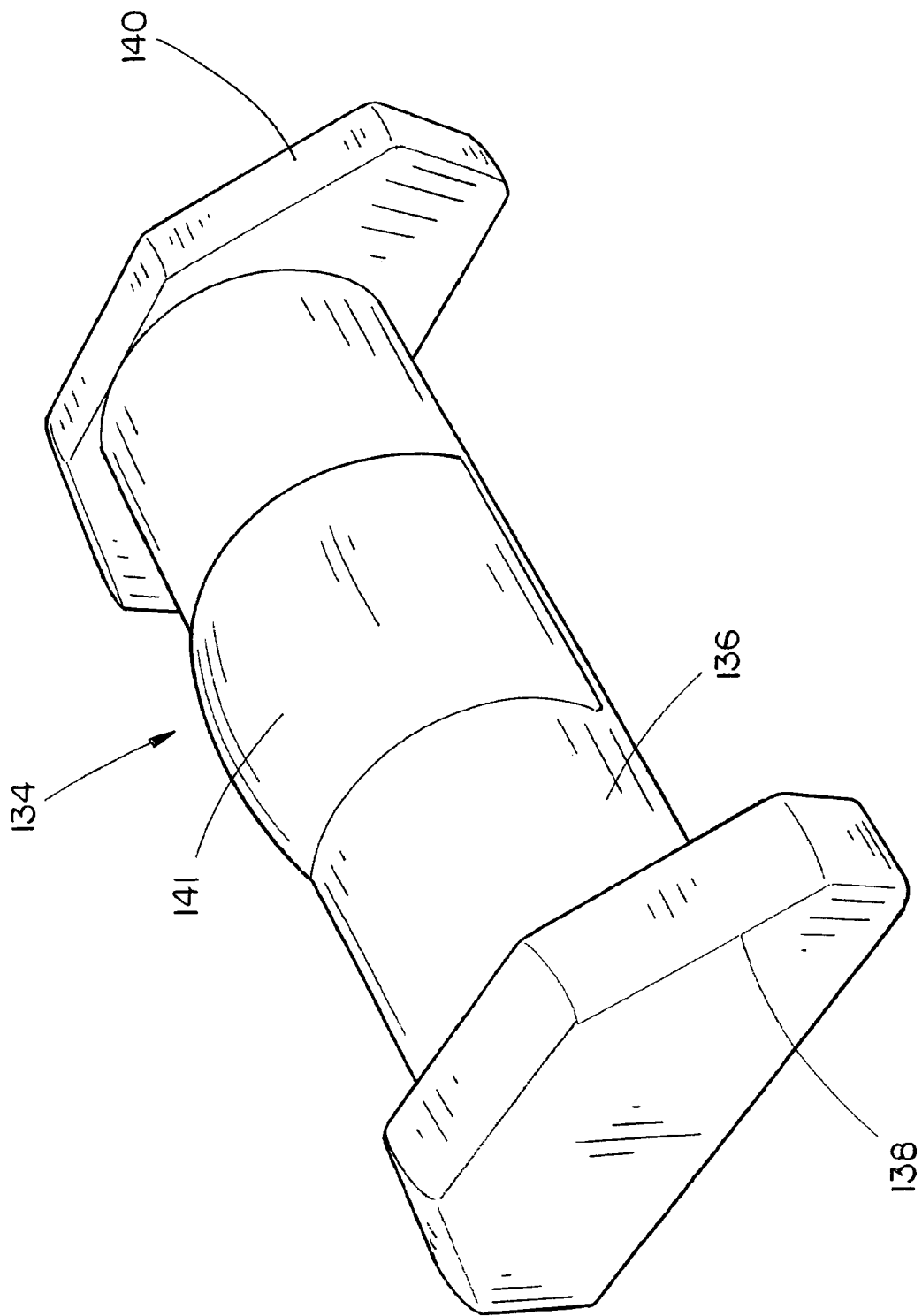
FIG. 6 is a perspective view of a modified pivot pin.
Figure 7:
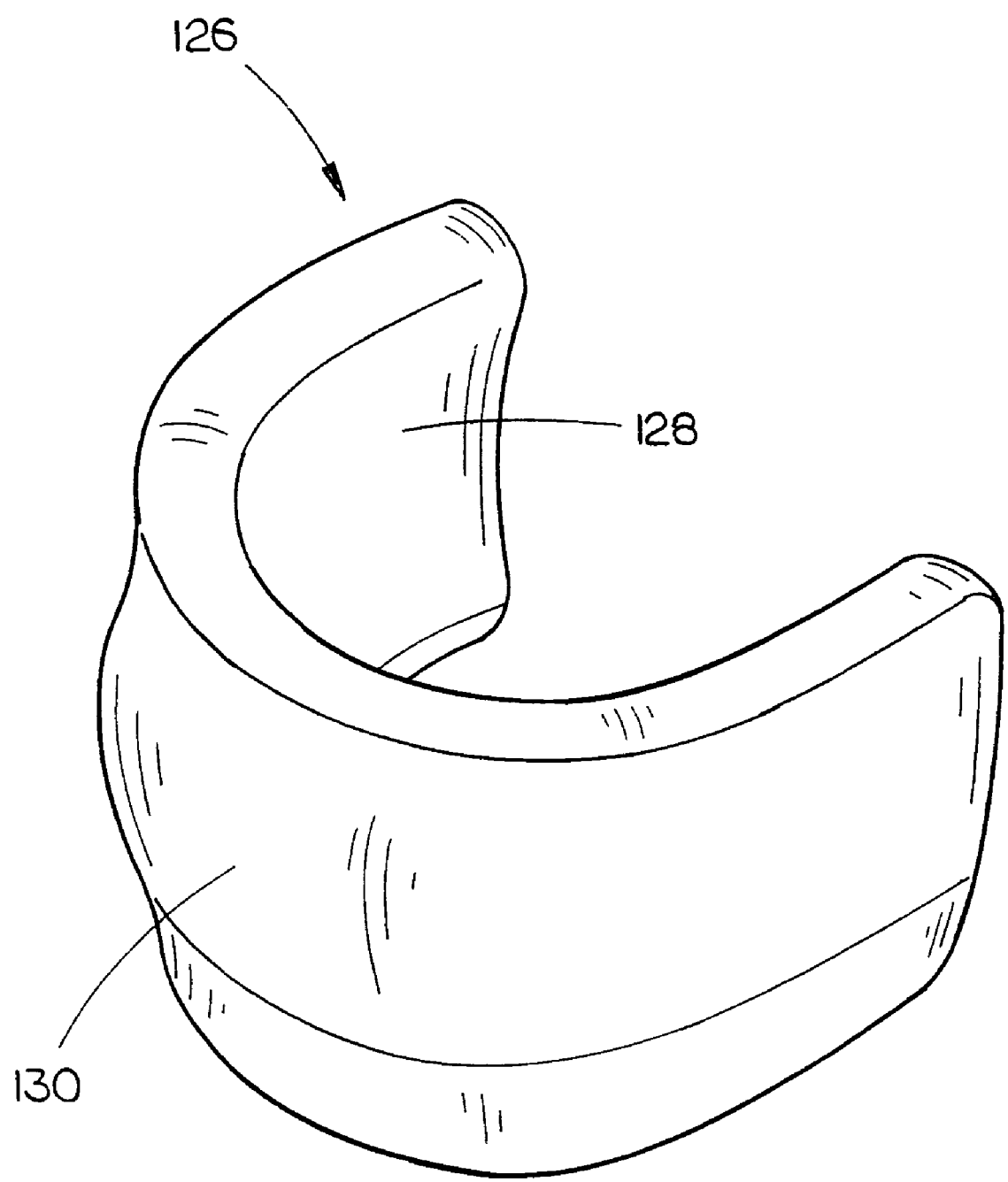
FIG. 7 is a perspective view of a modified insert designed for use with the pivot pin of FIG. 6.

FIG. 6 illustrates a modified form of a metal pivot pin which is designated by the reference numeral 134 and which may replace the pivot pin 34 and which will be used with the non-metallic insert 126 which is shown in FIG. 7. Pin 134 includes a cylindrical center section 136 and opposite head portions 138 and 140. Center section 136 is provided with a centrally located convex portion 141 which protrudes outwardly from center section 136 for a portion of the circumference thereof.

As seen in FIG. 7, insert 126 is generally U-shaped and may have side edges or flanges provided thereon which will embrace the outer sides of the ends of the link 12. Insert 126 is provided with a concave inner surface 128 and a convex outer surface 130. When inserts 126 are inserted into the ends of the link 12 and pin 134 is used therewith, the convex portion 141 of pin 134 will be received within the concave inner surface 128 of insert 126. The engagement of the convex portion 141 with the concave inner surface 128 enlarges the contact surface between the pin 134 and the insert 126 when the chain is moving upwardly or downwardly in an inclined manner. Insert 126 is comprised of the same non-metallic surface as insert 26. When a prior art chain is moving upwardly or downwardly in an inclined fashion, there tends to be a single point or area of contact between the pin 34 and the link 12 which creates wear on that single point or area of contact.

Figure 8:
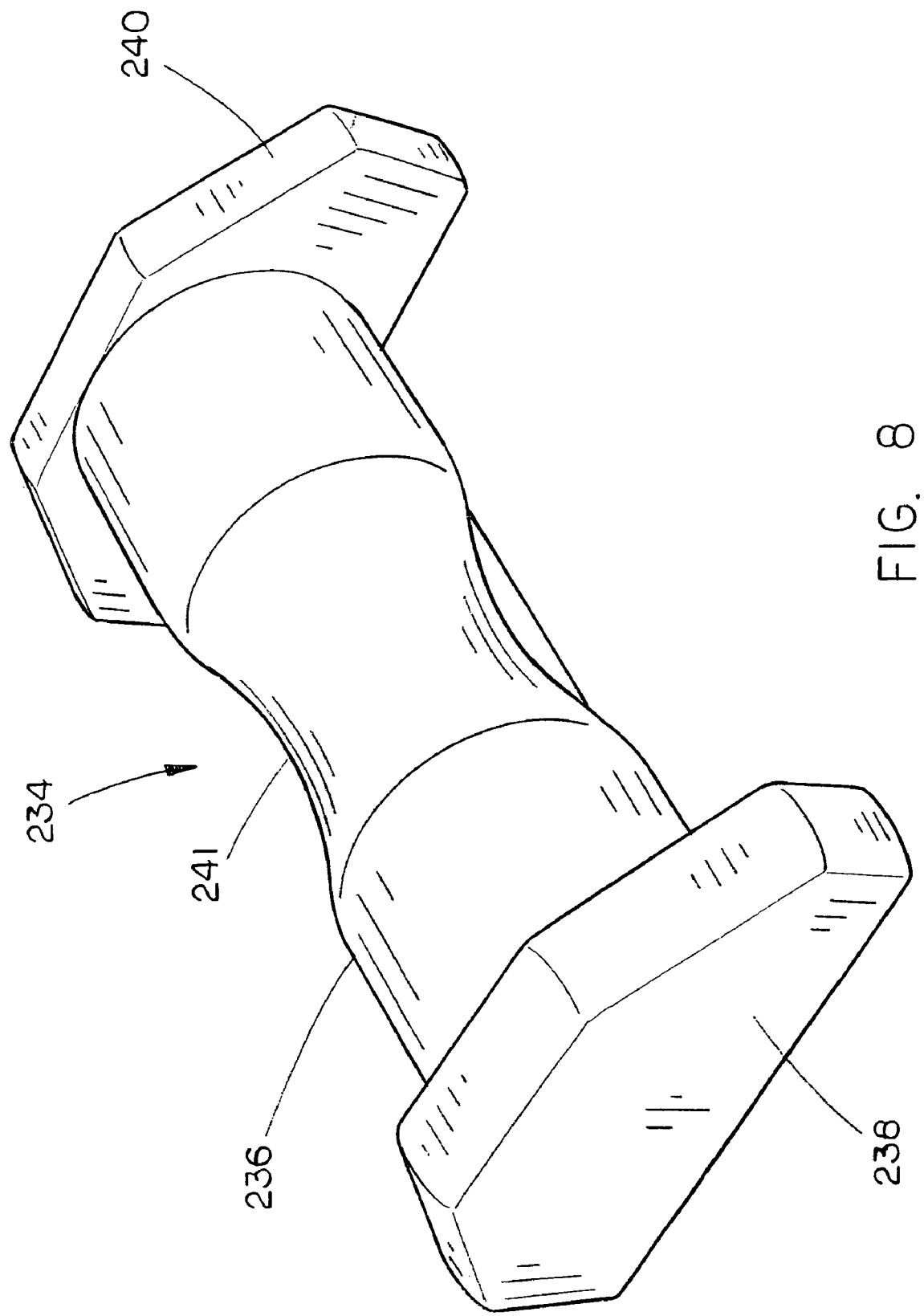
FIG. 8 is a perspective view of a further modified pivot pin.
Figure 9:
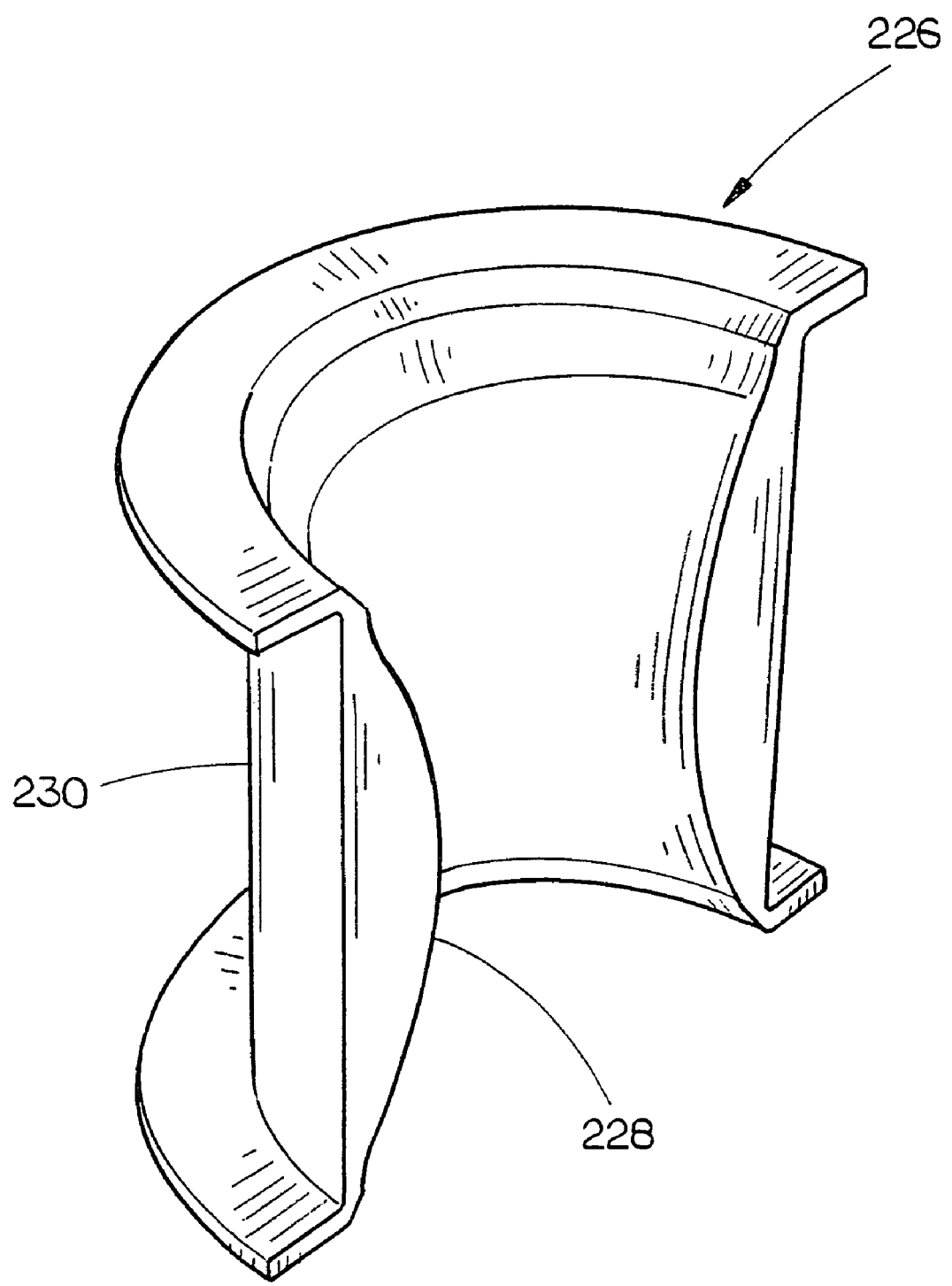
FIG. 9 is a perspective view of a further modified insert designed for use with the pivot pin of FIG. 8.

FIG. 8 illustrates yet another modified form of a metal pivot pin which is designated by the reference 234 and which may replace the pivot pin 34 and which will be used with the non-metallic insert 226 which is shown in FIG. 9. Pin 234 includes a cylindrical center section 236 and opposite head portions 238 and 240. Center section 236 is provided with a centrally located concave portion 241 which extends into center section 236 for a portion of the circumference thereof.

As seen in FIG. 9, insert 226 is generally U-shaped and may have side edges or flanges provided thereon which will embrace the outer sides of the ends of the link 12. Insert 226 is provided with a convex inner surface 228 and a cylindrical outer surface 230. When inserts 226 are inserted into the ends of the link 12 and pin 234 is used therewith, the concave portion 241 of pin 234 will be received by the convex inner surface 228 of insert 226. The engagement of the concave portion 241 with the convex surface 228 enlarges the contact surface between the pin 234 and the insert 236 when the chain is moving upwardly or downwardly in an inclined manner. Insert 226 is comprised of the same non-metallic surface as insert 26. When a prior art chain is moving upwardly or downwardly in an inclined fashion, there tends to be a single point or area of contact between the pin 34 and the link 12 which creates wear on that single point or area of contact.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A conveyor chain comprising:

a plurality of substantially identical alternate, elongated main links comprised of a metal material;

each of said main links having a longitudinally extending opening formed therein which defines generally U-shaped pivot pin receiving portions at the opposite ends thereof;

a non-metallic, generally U-shaped insert positioned in each of said U-shaped pivot pin receiving portions;

alternate pairs of substantially identical upper and lower links between said main links which are comprised of a metal material;

metal pivot pins interconnecting said main links and said upper and lower links;

said metal pivot pins being received by said U-shaped inserts thereby preventing said metal pivot pins from engaging said metal pivot pin receiving portions of said main links;

each of said U-shaped inserts having inner and outer surfaces and wherein said inner surface of each of said inserts has a concave portion formed therein and wherein each of said pivot pins has a generally cylindrical center portion which has a convex portion extending therefrom for only a portion of the circumference thereof which is received by said concave portion of said insert.

2. A conveyor chain comprising:

a plurality of substantially identical alternate, elongated main links comprised of a metal material;

each of said main links having a longitudinally extending opening formed therein which defines generally U-shaped pivot pin receiving portions at the opposite ends thereof;

a non-metallic, generally U-shaped insert positioned in each of said U-shaped pivot pin receiving portions;

alternate pairs of substantially identical upper and lower links between said main links which are comprised of a metal material;

metal pivot pins interconnecting said main links and said upper and lower links;

said metal pivot pins being received by said U-shaped inserts thereby preventing said metal pivot pins from engaging said metal pivot pin receiving portions of said main links;

each of said U-shaped inserts having inner and outer surfaces and wherein said inner surface of each of said inserts has a convex portion formed therein and wherein each of said pivot pins has a generally cylindrical center portion which has a concave portion extending thereinto for only a portion of the circumference thereof which receives said convex portion of said insert.

* * * * *